United States Patent [19]
Kopp

[11] 3,841,315
[45] Oct. 15, 1974

[54] METHOD AND APPARATUS FOR CONTINUOUSLY MONITORING HEARTBEAT RATE

[75] Inventor: Keith A. Kopp, Bensenville, Ill.

[73] Assignee: Eagle Monitor Systems, Chicago, Ill.

[22] Filed: Mar. 14, 1973

[21] Appl. No.: 341,158

[52] U.S. Cl. .......................................... 128/2.06 F
[51] Int. Cl. ............................................. A61b 5/04
[58] Field of Search ..... 128/2.05 R, 2.05 T, 2.06 A, 128/2.06 B, 2.06 F, 2.06 R

[56] References Cited
UNITED STATES PATENTS

| | | | |
|---|---|---|---|
| 3,174,478 | 3/1965 | Kahn | 128/2.06 F |
| 3,528,405 | 9/1970 | Schuler | 128/2.06 B |
| 3,595,219 | 7/1971 | Friedlander et al. | 128/2.06 F |
| 3,675,643 | 7/1972 | Funfstuck | 128/2.06 F |
| 3,721,230 | 3/1973 | Ziernicki | 128/2.06 B |

OTHER PUBLICATIONS

Huntsman et al., "I.E.E.E. Transactions on Biomedical Engineering," Vol. 18, No. 4, July, 1971, pp. 301-304.

*Primary Examiner*—William E. Kamm
*Attorney, Agent, or Firm*—Merriam, Marshall, Shapiro & Klose

[57] ABSTRACT

A wearable heart rate monitor for continuously monitoring the heart rate of an ambulatory wearer and alerting him whenever his heart rate rises above a preselected maximum level or falls below a preselected minimum level is disclosed. More particularly, the monitor includes means for monitoring the heart beat of the wearer and generating output pulses coincident therewith and means for averaging the output pulses to develop an average signal having an amplitude level directly proportional to the heartbeat rate. The electrical signal is coupled to comparator means which applies a drive potential to an alarm device whenever the averaged signal exceeds or drops below preselected maximum and minimum heart rate threshold levels. Gating means enable the alarm device coincident with the output pulses thereby permitting the alarm device to generate an interrupted audio tone having a frequency corresponding to the monitored heartbeat rate whenever the heartbeat rate exceeds the maximum threshold level. When the heart rate falls below the minimum level, the alarm means is continuously enabled by the gating means to produce a continuous audio tone responsive to the drive potential from the comparator means. In either event, the wearer is alerted to the abnormal heart condition so that corrective action can be taken.

14 Claims, 2 Drawing Figures

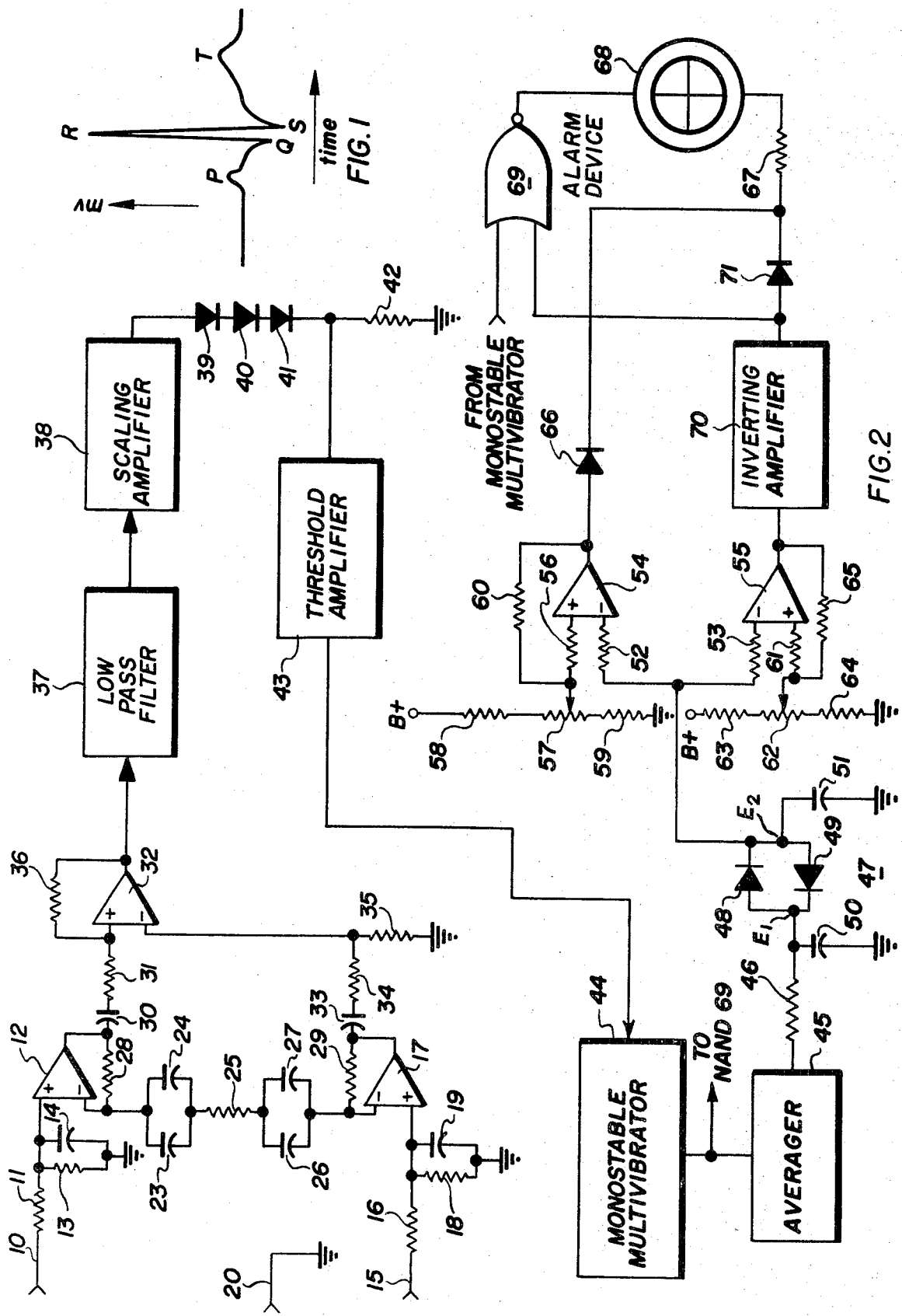

METHOD AND APPARATUS FOR CONTINUOUSLY MONITORING HEARTBEAT RATE

The present invention relates generally to method and apparatus for monitoring heart rate and more particularly to a continuously wearable cardiac rate monitor for alerting the wearer when his heart is beating at a rate exceeding a preselected maximum threshold level.

It has been generally recognized that the stress level of the heart is functionally related to the heart rate. Accordingly, there are at least two fundamental areas in which there arises a definite need to monitor the heart rate.

The first area of concern comprises the prevention of further damage to a limited capacity heart. Many individuals who have experienced a cardio-vascular incident must limit their exertion level to prevent further damage. Physicians commonly attempt to modify the behaviorial patterns of these individuals by indicating which activities are to be avoided, however, even seemingly innocuous activities can combine to overstress the heart. Also, the patient may, on occasion, forget himself in moments of stress.

The second area concerns the monitoring of a normal heart to prevent over-stressing and subsequent damaging of the heart during severe physical exertion. To prevent over-stressing the normal heart, as may happen with athletes during conditioning, it has been determined that a level of exertion which produces 160 to 170 beats per minute offers the maximum rate of conditioning for a young athlete. Since each athlete is in a somewhat different state of physical condition, the same level of exertion that would overtax some will not provide enough for others. Thus, by monitoring his own heart rate, the athlete can achieve maximum conditioning in a minimum time span without the dangers of over-exertion.

While cardiac monitor systems have been developed for use in the intensive care or diagnostic environment, such systems provide no protection for a person who is not hospitalized, but instead, is attempting to lead a normal life. Therefore, a device which could continuously monitor the heart rate in subjects who have either a restricted capacity heart or whose heart is subjected to high levels of exertion would be quite beneficial.

If, however, a continuously wearable cardiac rate monitor is to be provided, an environment not encountered in conventional intensive care or diagnostic cardiac monitoring must be handled. For example, the unit must be able to resolve the electrical signals representative of the heart beat from similar electromyographic (EMG) signals generated by the body's muscular system. While the EMG signals are relatively small in the quiescent subject encountered in the intensive care and diagnostic environment, they can obscure the heart beat signal in a physically active subject.

Moreover, in the intensive care or diagnostic environment, electromagnetic radiation sources are both predictable and, in most cases, controllable, whereas an ambulatory subject is exposed to a variety of potentially interfering signal sources. Another source of interference arises from what is called "motion artifacts" which occur when the monitor electrode moves during physical activities, producing an electrically interfering signal from a change in skin-electrode capacitance. Accordingly, a cardiac rate monitor must be able to accommodate these sources of interference and still produce a reliable cardiac rate record.

Finally, three additional requirements must be satisfied if the unit is to be wearable: 1) its physical size must be compact (e.g., shirt pocket size); 2) it must be light weight; and 3) power consumption must be minimal. These requirements are not nearly as compelling in a stationary intensive care or diagnostic unit.

The heart rate monitor of the present invention monitors the heart rate of an ambulatory wearer and provides an alarm signal whenever the monitored heart rate rises above a preselected maximum threshold level or falls below a preselected minimum threshold level. The monitor includes means for monitoring the subject's heartbeat rate and generating output pulses coincident with the heartbeats monitored and means for averaging the output pulses to develop an averaged signal having an amplitude level directly proportional to the heart rate. The averaged signal is then coupled to a comparator means which selectably establishes a maximum threshold level corresponding to a particular heart rate. The threshold means also includes means for determining a minimum threshold level corresponding to a second particular heart rate. Whenever the heart rate (i.e., electrical signal) exceeds the maximum threshold level or drops below the minimum threshold level, the comparator means applies a drive potential to an alarm device.

Gating means are provided for enabling the alarm device to produce an observable stimulus (i.e., audio tone) in response to the drive potential from the comparator means. The gating means being effective to enable the alarm device coincident with the output pulses so that the alarm device generates a repetitive alarm signal at a frequency corresponding to the heart rate whenever the heart rate exceeds the maximum threshold level and to continuously enable the alarm device to generate a continuous alarm signal whenever the heart rate falls below the minimum heart rate.

The cardiac rate monitor of the present invention further includes a novel non-linear voltage divider for improving the signal-to-ratio of the input means by reducing the effect of unwanted interfering signals, and a low amplitude ripple filter for reducing the residual ripple in the averaged signal while providing quick response to amplitude level shifts of the averaged signal corresponding to changes in heart rate.

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

FIG. 1 is illustrative of the QRS cardiac complex corresponding to the heart beat detected by the cardiac rate monitor of the present invention; and FIG. 2 is a combined schematic and block diagram of a continuously wearable cardiac rate monitor in accordance with an embodiment of the invention.

It is well-known that electrocardiography finds its physiological basis in the neuromuscular mechanism of the heart. That is, when the heart muscle contracts (i.e., the heart "beats") responsive to a stimulus, a small electric current called the excitation, or depolarization, wave is set up in the heart. The heart beat wave form (i.e., electrocardiogram) shown in FIG. 1 illustrates the action of the heart.

As the excitation wave spreads in concentric rings over the auricular wall, causing the auricles to contract, the gradual rise and decline of the excitation wave in the auricle produces a corresponding, observable shift called the auricular (P) wave in the waveform shown in FIG. 1.

The excitation wave is delayed at the junctional tissue between the auricle and ventricle by the antrioventricular (A-V) node, but once having penetrated, it is conducted rapidly across the neuromuscular bundle of His. A sharp pulse (R) is developed as the excitation wave passes through the junctional tissue (i.e., A-V node) and spreads across the ventricular neutral net of the His bundle. The R pulse corresponds to a single heart beat. Q and S are terms used respectively to identify a small dip just preceding the R wave and a steep valley of variable length immediately following the R wave.

Having passed through the His, the excitation wave then passes through the ventricular muscle at a much slower rate, causing the ventricles to contract. Subsequently, the ventricular muscle is repolarized to an electrically neutral state coinciding with the resting phase of the ventricle. The contraction and subsequent relaxation of the ventrical produces the ventricular (T) portion of the waveform in FIG. 1.

After a period of inactivity, another stimulus is applied to the heart, providing another excitation wave so that the heart follows the familiar cycle — auricular contraction, ventricular contraction and heart rest. Accordingly, heart rate can be determined by counting the number of QRS cardiac complex signals (i.e., R pulses) occurring during a predetermined time interval.

The continuously wearable cardiac rate monitor shown in FIG. 2 is compatible with the utilization of Large Scale Integration (LSI) technology for packaging the monitor in a unit having "shirt pocket" dimensions, weighing about eight ounces and having a power consumption of under one milliwatt.

Referring now to FIG. 2, there is shown a continuously wearable cardiac rate monitor for monitoring the wearer's QRS cardiac complex frequency (i.e., heart rate) and alerting the wearer whenever his heart rate rises above a preselected maximum rate level or falls below a minimum level.

Accordingly, a positive electrode 10 is placed in physical contact with the wearer's body at a strong pulse point so that the QRS cardiac complex may be more easily monitored. The detected waveform is then coupled through a resistor 11 to the positive input of an operational amplifier 12. A filter comprising resistor 11 and capacitor 14 is connected between the positive input of amplifier 12 and the positive electrode 10 to bypass certain unwanted high frequency components to ground. Resistor 13 stabilizes the differential input impedance. Similarly, a negative electrode 15 monitors QRS complex at a second point on the wearer's body and couples it through a resistor 16 to the positive input of a second operational amplifier 17. Again, the high frequency components are bypassed to ground by resistor 16 and capacitor 19 which are coupled from the positive input of amplifier 17 to the negative electrode 15. A resistor 18 is coupled in parallel with capacitor 19. A reference electrode 20 is also provided to reduce AC interference.

Since the electromyographic (EMG) signals generated by the body's muscular system and stray electromagnetic radiation are predominately common mode signals, the input amplifier is designed to have a very high common mode rejection ratio to prevent them from obscuring the QRS complex in a physically active subject. However, movement artifacts resulting from change in the skin-electrode capacitance and other forms of residual signals have differential components which must be dealt with in the frequency domain. Thus, the input amplifier stage should have reduced gain for frequencies at or above 60 Hz while providing as much gain as possible in the range the human heart rate, or frequency. Accordingly, the negative inputs of operational amplifiers 12 and 17 are capacitively cross-coupled by a series combination comprising: the parallel combination of capacitors 23 and 24; resistor 25; and the parallel combination of capacitors 26 and 27. The capacitive cross-coupling between the two input amplifiers 12 and 17 effectively reduces the differential gain at the unwanted frequencies while maintaining a high common mode rejection ratio and constant input impedance.

A pair of resistors 28 and 29 couple the respective outputs of amplifiers 12 and 17 to their corresponding negative inputs. The output signal from operational amplifier 12 is then capacitively coupled through the serially connected capacitor 30 and resistor 31 to the positive input of operational amplifier 32. Similarly, the output signal from operational amplifier 17 is coupled through a capacitor 33 and a voltage divider comprising resistors 34 and 35 to ground. Consequently, a threshold is determined at the negative input of amplifier 32 by virtue of its connection to the junction of resistors 34 and 35. A feedback resistor 36 interconnects the output of amplifier 32 and its positive input.

The amplified signal is then coupled through a low pass filter 37 which further reduces the amplitude of electromyographic (EMG) signals, 60 Hz interference, or any other unwanted frequency components by 18db/octave. The filtered signal is subsequently coupled to a scaling amplifier 38 where the overall system gain may be adjusted.

The amplified and filtered signal is, in turn, coupled to a non-linear voltage divider where the signal-to-noise ratio is enhanced. The non-linear voltage divider comprises three diodes 39, 40, 41 and a resistor 42 connected in series between the output of the scaling amplifier 38 and ground. The resultant signal developed at the junction of diode 41 and resistor 42 has an improved signal-to-noise ratio because small amplitude signals are divided by a much larger factor than are large amplitude signals. That is, the unwanted frequency components which were already reduced in amplitude by the low pass filter 37 are confronted by a higher resistance due to the non-linear dynamic resistance of diodes 39, 40 and 41. More particularly, the dynamic resistance decreases as the voltage applied across the diodes increases. Accordingly, the larger amplitude QRS cardiac complex, which was not attenuated by the low pass filter 37, faces less resistance than the unwanted frequency components. Consequently, the signal-to-noise ratio is improved.

Next, the signal developed at the junction of diode 41 and resistor 42 is coupled to a threshold amplifier 43 which discriminates between the relatively high amplitude R waves and any remaining low amplitude interference, developing a spiked trigger pulse whenever the signal exceeds a preset amplitude. These trigger spikes are then coupled to a monostable multivibrator 44 which, in turn, produces a corresponding constant pulse-width signal. Accordingly, the pulses developed by the monostable multivibrator 44 correspond to the QRS cardiac complexes observed; that is, one pulse is generated for each heart beat; and as a result, the rate at which the pulses are generated by the monostable multivibrator 44 increases or decreases responsive to changes in the wearer's heart rate. This pulse train is subsequently coupled to an averager 45 where the pulses are averaged to provide a voltage analog having an amplitude proportional to the input frequency of the QRS cardiac complex (i.e., heart rate).

The voltage analog is then coupled through a resistor 46 to the input of a low amplitude ripple filter, identified generally at 47. The filter 47 comprises a pair of diodes 48 and 49 connected in parallel, and a pair of capacitors 50 and 51 coupled between opposite ends of the diode arrangement and ground. In addition, diodes 48 and 49 are connected so that diode 48 has its cathode connected to the anode of diode 49 and its anode connected to the cathode of diode 49.

The effective resistance of diodes 48 and 49 is an exponential function of the voltage developed across them. Therefore, the time constant of the circuit formed by diodes 48, 49 and capacitor 51 is a function of the voltage across diodes 48 and 49, that is, $E_1-E_2$, and the resultant voltage developed at the junction of diodes 48, 49 and capacitor 51 is proportional to the frequency, or heart rate, being monitored.

Thus, the low amplitude ripple filter 47 provides additional filtering when the voltage difference ($E_1-E_2$) across the diode arrangement is small. The filter, however, does not appreciably affect the overall response to a change in the input frequency. Therefore, the circuit responds quickly to changes in the input rate but suppresses residual ripple.

The voltage analog of the heart rate is, in turn, coupled through resistors 52 and 53 to the corresponding negative inputs of operational amplifiers 54 and 55 which combine to form a window comparator circuit.

The positive input of amplifier 54 is coupled through resistor 56 to the wiper arm of a potentiometer 57 connected in series between resistors 58 and 59, the opposite ends of which are interconnected between a source of reference potential (B+) and ground. By adjusting the wiper arm of potentiometer 59, a selectable DC voltage is applied to the positive input of amplifier 54. In this manner, a threshold may be selected above which the voltage applied to the negative input of amplifier 54 must rise before an output signal will be generated by amplifier 54. A feedback resistor 60 couples the output of amplifier 54 to the wiper arm of potentiometer 59. Similarly, the positive input of amplifier 55 is coupled through resistor 61 to the wiper arm of potentiometer 62. Potentiometer 62, in turn, is serially connected with resistors 63 and 64 between the source of B+ potential and ground, and accordingly, a threshold can likewise be selected for amplifier 55. A feedback resistor 65 couples the output of amplifier 55 to the junction of resistor 61 and the wiper arm of potentiometer 62.

Accordingly, a maximum heart rate threshold and a minimum heart rate threshold can be selected by adjusting potentiometers 57 and 62, respectively, so that the threshold voltages applied to the positive inputs of amplifiers 54 and 55 correspond to the voltage developed at the output of low amplitude ripple filter for the particular maximum and minimum heart rates selected.

If the voltage developed at the output of the low amplitude ripple filter 47 exceeds the maximum heart rate threshold determined by amplifier 54, the continuous positive output voltage developed by amplifier 54 is coupled through diode 66 and resistor 67 to audio alarm device 68. The other input of the alarm 68 is coupled to the output of monostable multivibrator 44 through NOR gate 69. Thus, each pulse developed by multivibrator 44, which is representative of a single heart beat, and applied to the input of NOR 69 switches NOR 69 to its low voltage output state. Consequently, whenever the maximum heart rate threshold is exceeded, the positive voltage applied to the alarm 68 produces a tone coincident with the occurrence of each R wave, and the subject is able to observe his own heart rate.

If, on the other hand, the subject's heart rate falls below the minimum threshold, the normally conducting operational amplifier 55 is turned off. The output of amplifier 55, however, is coupled to an inverting amplifier 70 which is switched on to produce an output voltage whenever the operational amplifier 55 is off. The output signal from inverting amplifier 70 is then coupled through diode 71 to the junction of diode 66 and resistor 67. As a result, when the subject's heart rate falls below the minimum threshold, a positive voltage is applied to the alarm 68 by means of diode 71 and resistor 67. The output signal from the inverting amplifier 70 is also coupled to the other input of NOR 69, switching it to its low voltage output state. Accordingly, if the subject's heart rate is less than the minimum threshold level, the alarm 68 is enabled, and a continuous audio tone is generated to alert the wearer of the abnormal condition. The polarity of diodes 66 and 71 are such that the maximum and minimum output voltages will not be coupled to the nonactive one of amplifiers 54 and 55.

Accordingly, a continuously wearable cardiac rate monitor having an adjustable, built-in alarm system for monitoring the heart rate of active subjects has been disclosed. The unit utilizes a unique non-linear voltage divider to improve the signal-to-noise ratio of the monitored QRS cardias complex signals and a low amplitude ripple filter to maintain rapid response time to changing heart rates while reducing residual ripple.

A cardiac patient wearing the monitor who over exerts, causing his heart rate to rise beyond a prescribed level will be alerted by the monitor's internal audio alarm so that he can immediately reduce his activity level. Similarly, if the heart rate falls below the prescribed minimum, the audio alarm alerts the wearer and people within hearing distance of the dangerous condition. Moreover, this unit can be expanded to monitor sleeping patients and send an alarm signal to an external station. In smaller hospitals and nursing homes where economic factors prohibit intensive care systems, this cardiac monitor system can provide an important measure of additional protection. This system may also be used in larger institutions where the patient is not in a sufficiently serious condition to warrant the utilization of the limited space of an intensive care unit.

While a particular embodiment of the present invention has been shown and described it will obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. A cardiac rate monitor for continuously monitoring the heartbeat rate of the wearer, said monitor including an alarm device for alerting said wearer whenever a maximum desirable heartbeat rate is exceeded, said monitor comprising:

means for monitoring said heartbeat of said wearer, said means including pulse means for generating output pulses substantially coincident with corresponding ones of said heartbeats monitored by said monitoring means;

averaging means coupled to said pulse means for averaging said output pulses to develop an averaged signal having an amplitude level directly proportional to said heartbeat rate;

comparator means coupled to said averaging means for selectably establishing a maximum threshold level corresponding to said maximum desirable heartbeat rate, said comparator means applying a drive potential to said alarm device whenever said averaged signal exceeds said maximum threshold level; and gating means having an input coupled to said pulse means and an output coupled to said alarm device, said gating means disabling said alarm device during intervals between said output pulses and enabling said alarm device to generate an alarm signal responsive to said drive potential only during intervals corresponding to said output pulses thereby causing said alarm device to generate a repetitive alarm signal occurring at a rate coincident with said heartbeat rate whenever said averaged signal exceeds said maximum threshold level.

2. A cardiac rate monitor for continuously monitoring the heartbeat rate of the wearer, said monitor including an alarm device for alerting said wearer whenever a maximum desirable heartbeat rate is exceeded and whenever said heartbeat rate falls below a minimum desirable heartbeat rate, said monitor comprising:

means for monitoring said heartbeat of said wearer, said means including pulse means for generating output pulses substantially coincident with corresponding ones of said heartbeats monitored by said monitoring means;

averaging means coupled to said pulse means for averaging said output pulses to develop an averaged signal having an amplitude level directly proportional to said heartbeat rate;

window comparator means coupled to said averaging means for selectably establishing a maximum threshold level corresponding to said maximum desirable heartbeat rate and a minimum threshold level corresponding to said minimum desirable heartbeat rate, said window comparator means applying separate drive potentials to said alarm device whenever said averaged signal exceeds said maximum threshold level and whenever said averaged signal is below said minimum threshold level; and gating means having inputs coupled to said pulse means and said maximum drive potential of said window comparator means and an output coupled to said alarm device, said gating means disabling said alarm device during intervals between said output pulses and enabling said alarm device to generate an alarm signal responsive to said drive potential only during intervals corresponding to said output pulses whenever said averaged signal exceeds said maximum threshold level thereby causing said alarm device to generate a repetitive alarm signal occurring at a rate coincident with said heartbeat rate, said gating means continuously enabling said alarm device responsive to said window comparator means in response to an absence of said maximum drive potential whenever said averaged signal is below said minimum threshold level thereby causing said alarm device to generate a continuous alarm signal.

3. A cardiac rate monitor in accordance with claim 2 wherein said window comparator means comprises first amplifier means and second amplifier means having respective inputs coupled to said averaging means and respective outputs coupled to said alarm device, said window comparator means further comprising maximum threshold means coupled to said first amplifier means and minimum threshold means coupled to said second amplifier means for respectively determining said maximum threshold level and said minimum threshold level, said first amplifier means generating said drive potential when said averaged signal exceeds said maximum threshold level and said second amplifier means generating said drive potential when said averaged signal is below said minimum threshold level, and wherein said gating means comprises a logic gate having inputs coupled to said pulse means and said second amplifier means output and an output coupled to said alarm device, said logic gate enabling said alarm device during intervals corresponding to said output pulses so that said alarm device generates said repetitive alarm signal at said heartbeat rate when said first amplifier means generates said drive potential, said logic gate continuously enabling said alarm device responsive to said second amplifier means generating said drive potential so that said drive potential from the second amplifier means is then effective to drive said alarm device to produce said continuous alarm signal.

4. A cardiac rate monitor in accordance with claim 3 wherein said logic gate comprises a NOR gate.

5. A cardiac rate monitor in accordance with claim 2 wherein said monitoring means includes input amplifier means having a pair of inputs for monitoring said heartbeats, said input amplifier means developing an output signal representative of said heartbeats, said pulse means generating said output pulses substantially coincident with said heartbeats responsive to said input amplifier means output signal being coupled thereto, said input amplifier means having a high common mode rejection ratio for reducing interference from electromyographic signals and electromagnetic radiation.

6. A cardiac rate monitor in accordance with claim 5 wherein said input amplifier means comprises a capacitive cross-coupling network and first, second and third operational amplifiers having respective input pairs and outputs, respective ones of said first and second operational amplifier inputs monitoring said heartbeats while said first and second operational amplifier outputs are coupled to corresponding ones of said third operational amplifier inputs, said third operational amplifier output being coupled to said pulse means, the other ones of said first and second operational amplifiers being interconnected by said capacitive cross-coupling network, said capacitive cross-coupling network comprising first and second pairs of parallel coupled capacitors and a resistor interposed in series between said first and second capacitor pairs; said capacitive cross-coupling network reducing the differential gain of said input amplifier means at frequencies outside the expected range of said heartbeat rate while maintianing a high common mode rejection ratio and constant input impedance.

7. A cardiac rate monitor in accordance with claim 5 including a non-linear voltage divider coupling said input amplifier means to said pulse means, said non-linear voltage divider improving the signal-to-noise ratio of said input amplifier output signal.

8. A cardiac rate monitor in accordance with claim 7 including a DC reference potential and wherein said non-linear voltage divider comprises a plurality of diodes and a resistor connected in series between said input amplifier means and said DC reference potential, said pulse means being coupled to the junction of said diode series and said resistor, said diodes having a dynamic resistance decreasing with increasing potential applied thereacross so that small amplitude interfering signals are attenuated at the junction of said diode series and said resistor by a greater factor than that portion of said input amplifier means output signal representative of said heartbeats and having larger amplitudes.

9. A cardiac rate monitor in accordance with claim 2 including a low amplitude ripple filter having an input coupled to said averaging means and an output coupled to said comparator means, said filter suppressing residual ripple in said averaged signal while responding quickly to variations in said averaged signal amplitude level resulting from changes in said heartbeat rate.

10. A cardiac rate monitor in accordance with claim 9 having a DC reference potential and wherein said low amplitude ripple filter comprises a pair of diodes coupled in parallel between said filter input and said filter output and a pair of capacitors, one of said capacitors being coupled between said filter input and said DC reference potential and the other of said capacitors being coupled between said filter output and said DC reference potential, the cathode of one of said diodes being coupled to the anode of the other of said diodes and the anode of said one diode being coupled to the cathode of said other diode, said filter time constant being a function of said averaged signal amplitude level applied across said diodes.

11. A cardiac rate monitor in accordance with claim 2 wherein said pulse means comprises a monostable multivibrator.

12. In a cardiac rate monitor having first means for continuously monitoring the heartbeat rate of the wearer and developing a signal having an amplitude level directly proportional to said heartbeat rate and second means for selectably establishing a maximum threshold level corresponding to a particular heartbeat rate and developing a drive potential for driving an alarm device whenever said signal exceeds said maximum threshold level said monitor also providing a DC reference potential, the improvement comprising:

a low amplitude ripple filter comprising a $\pi$-filter for coupling said signal from said first means to said second means, said $\pi$-filter comprising a pair of diodes coupled in a parallel arrangement between said first means and said second means and a pair of capacitors, said capacitors being coupled at opposite ends of said parallel diode arrangement to said DC reference potential, the cathode of one of said diodes being coupled to the anode of the other of said diodes and the anode of said one diode being coupled to the cathode of said other diode, said filter time constant being a function of said averaged signal amplitude level applied across said diodes whereby said low amplitude ripple filter is able to respond quickly to changes in the frequency of said heartbeat rate.

13. The method of continuously monitoring heartbeat rate sounding an alarm device to alert the wearer whenever a maximum desirable heartbeat rate is detected, said method comprising:

monitoring said heartbeats;

generating output pulses substantially coincident with corresponding ones of said heartbeats;

averaging said output pulses to develop an averaged signal having an amplitude level directly proportional to said heartbeat rate;

establishing a selectable maximum theshold level corresponding to said maximum desirable heartbeat rate;

applying a drive potential to said alarm device whenever said averaged signal exceeds said maximum threshold level;

gating said alarm device responsive to said output pulses to disable said alarm device during intervals between said output pulses and enable said alarm device to generate an alarm signal responsive to said drive potential only during intervals corresponding to said output pulses thereby causing said alarm device to generate a repetitive alarm signal occurring at a rate coincident with said heartbeat rate, whenever said averaged signal exceeds said maximum threshold level.

14. The method of claim 13 which includes establishing a selectable minimum threshold level, applying said drive potential to said alarm device responsive to said averaged signal dropping below said minimum threshold level and continuously enabling said alarm device whenever said averaged signal is below said minimum threshold level thereby causing said alarm device to generate a continuous alarm signal.

* * * * *